May 20, 1941. G. McMULLEN 2,243,012
CLEAR VISION WINDSHIELD FOR AUTOMOBILES AND OTHER VEHICLES
Filed Sept. 21, 1940
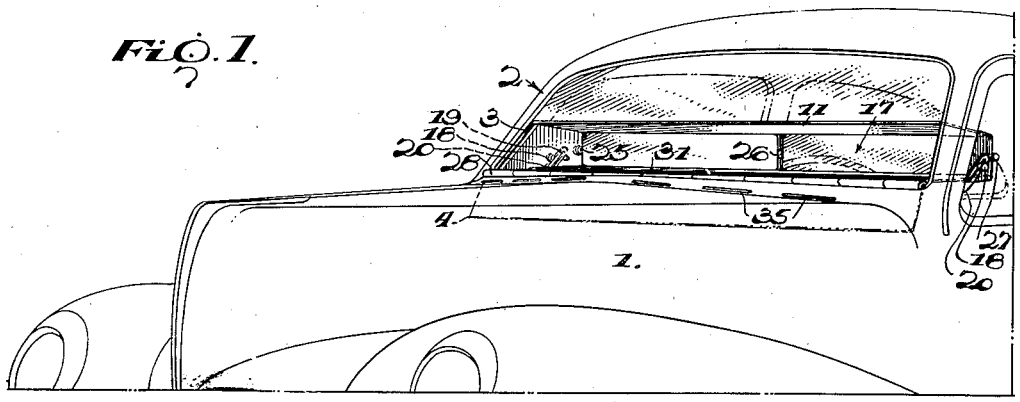
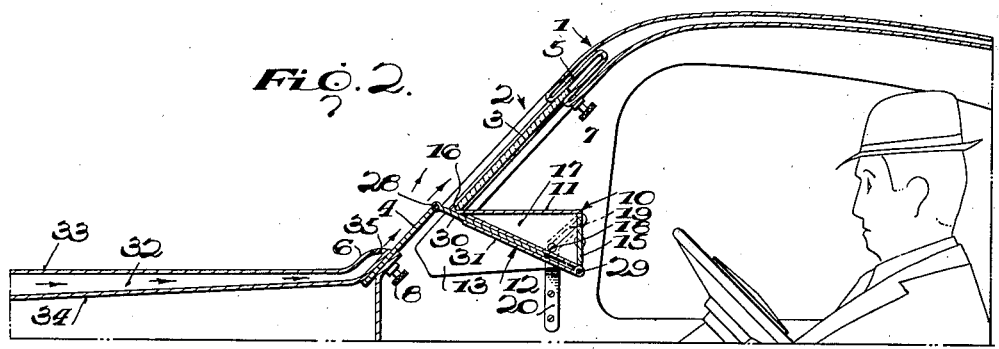
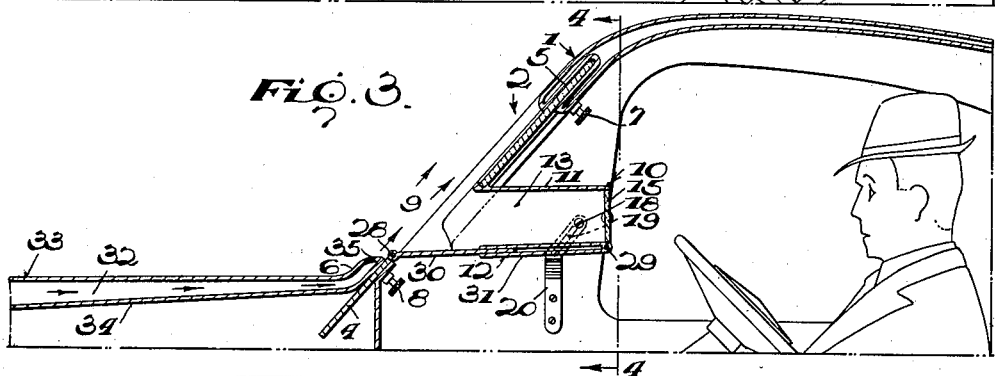
Inventor
George McMullen
By
Attorney Patented May 20, 1941

2,243,012

UNITED STATES PATENT OFFICE 2,243,012

CLEAR VISION WINDSHIELD FOR AUTOMOBILES AND OTHER VEHICLES

George McMullen, Rochester, N. Y.

Application September 21, 1940, Serial No. 357,796

11 Claims. (Cl. 296—84)

The present invention relates to a clear vision windshield for automobiles and other vehicles.

The object of the present invention is to provide for automobiles and other vehicles a windshield adapted in clear weather to function as an ordinary windshield and composed of relatively movable sections or parts adapted to be separated to afford at the line of vision of the operator or driver a sight or lookout opening or space to permit the functioning of a clear vision device normally located out of the way in an inoperative position interiorly of an automobile or other vehicle and equipped with a transparent wall or window and movable preferably simultaneously with the adjustment of the windshield sections to arrange it opposite the sight opening or space of the windshield in the line of vision of the driver or operator so as to provide a clear vision window which will not be affected by inclement weather to the same extent as the windshield and which will not be liable to become frosted or otherwise clouded or fogged like a windshield when subjected to rain, sleet, or snow in inclement weather.

A further object of the invention is to provide a clear vision windshield of this character composed of upper and lower sections slidable in guides or ways like the sashes of an ordinary window and adapted to be arranged contiguous to each other in clear weather and to be separated in inclement weather to provide the said lookout or sight opening at the front of a collapsible insulating chamber extending inwardly or rearwardly from the windshield and including top and bottom walls and a rear transparent wall or window and preferably provided with side walls, the rear wall or window being spaced rearwardly from the windshield and protected by said insulating space or chamber and also by the temperature of the interior of the automobile or other vehicle to which it is applied so that there will be little liability of the transparent wall or window being clouded, fogged or frosted.

Another object of the invention is to provide a clear vision device having at the rear wall panes or sections adapted to be reversed to permit ready wiping and cleaning and also to enable them to be arranged in an edgewise position to afford an unobstructed view through the chamber and sight opening of the windshield when desired.

A further object of the invention is to provide means for directing a warm current of air across the front of the sight opening of the windshield and the front end of the chamber of the collapsible receptacle and to reinforce or supplement the same with a current of air resulting from the forward movement of the automobile or other vehicle so as to tend to prevent entrance of rain, sleet, snow or wind entering the sight opening of the windshield and the collapsible chamber of the clear vision device.

With these and other objects in view, the invention consists in the construction and novel combination and arrangement of parts hereinafter fully described, illustrated in the accompanying drawing and pointed out in the claims hereto appended, it being understood that various changes in the form, proportion and details of construction, within the scope of the claims, may be resorted to without departing from the spirit or sacrificing any advantages of the invention.

In the drawing:

Figure 1 is a perspective view of a portion of an automobile provided with a clear vision windshield constructed in accordance with this invention.

Figure 2 is a central longitudinal sectional view of the same, the collapsible chamber of the clear vision device being in a collapsed condition out of the way for normal use of the windshield.

Figure 3 is a similar view, the sections of the windshield being separated to provide a sight opening and the clear vision device being arranged in operative position.

Figure 4 is a transverse sectional view taken substantially on the line 4—4 of Figure 3.

In the accompanying drawing in which is illustrated a preferred form of the invention 1 designates an automobile provided with a windshield 2 composed of upper and lower sections 3 and 4 slidable in upper and lower guides or ways 5 and 6 similar to the upper and lower sashes of an ordinary window and adapted to be arranged contiguous to each other for normal use of the windshield in clear weather as illustrated in Figure 2 of the drawing and to be separated to afford a sight or lookout opening as illustrated in Figure 3 of the drawing. The plane in which the upper section 3 of the windshield slides is preferably rearwardly offset slightly from the plane in which the lower section 4 of the windshield slides and upper and lower clamping devices preferably consisting of clamping screws 7 and 8 are provided for securing the upper and lower sections of the windshield in their adjustment.

When the upper and lower sections of the windshield are separated to afford a sight or lookout opening or space 9 a clear vision device 10 which is normally arranged out of the way and in inoperative position is brought into operative position at the lookout or sight opening of the windshield. The clear vision device 10 is preferably composed of top and bottom wall members 11 and 12, side walls 13 and a transparent rear wall or window 15. The top wall member 11 is preferably connected at the front edge 16 with the lower edge of the upper section of the windshield and the side walls 13 are preferably rigid with the top wall member 11 for closing the chamber 17 of the clear vision device at opposite sides of the automobile. The clear vision device preferably extends the full width of the windshield as clearly illustrated in Figure 4 of the drawing.

The side walls 13 are provided with laterally extending studs 18 which are slidable in slots 19 in brackets 20. The brackets 20 which are suitably secured to the automobile on opposite sides thereof are provided with inclined upper portions arranged in substantial parallelism with the upper section of the windshield and slidably supporting the clear vision device at the rear portion thereof so that the clear vision device may move upwardly and downwardly with the upper section of the windshield.

The transparent rear wall or window of the clear vision device is preferably formed by two transparent panes or sections 22 mounted within a transversely disposed oblong frame 23 by means of inner and outer horizontally aligned pivots 24 and 25. The oblong frame 23 is suitably secured at the top and ends to the top and side walls 11 and 13 of the clear vision device. The inner pivots 24 of the transparent panes or sections 22 are carried by a central bar or member 26 which extends from the top to the bottom of the oblong frame and is suitably secured to the same. The outer pivots 25 pierce the ends of the oblong frame and are preferably provided at their outer ends with operating discs or knobs 27 for enabling the transparent panes or sections 22 to be turned on a horizontal axis for reversing the sections or panes for wiping, cleaning and also for enabling the transparent panes or sections 22 to be arranged in an edgewise position for affording an unobstructed vision through the clear vision device and the sight or lookout opening of the windshield.

The bottom wall member 12 of the clear vision device is preferably hinged at its front edge 28 to the upper edge of the lower section 4 of the windshield and the rear edge of the bottom wall member 12 is hinged at 29 to the bottom of the oblong frame 23. The hinging of the front and rear edges of the bottom wall member 12 of the clear vision device will enable the clear vision device to collapse to the position illustrated in Figure 2 of the drawing to arrange it out of the way when the upper and lower sections of the windshield are closed to enable the windshield to function in clear weather as an ordinary windshield. Also the hinging of the bottom wall member 12 will enable the clear vision device to be arranged in a position in substantial parallelism with the top wall member 11 to define a chamber or space in line with and extending rearwardly from the sight or lookout opening of the windshield when it is desired to use the clear view device in inclement weather. The clear vision device which is adapted to eliminate the necessity of providing windshield wipers extends rearwardly from the windshield and is arranged interiorly of the body of the automobile so that the transparent rear wall or window of the clear vision device will be spaced rearwardly from the windshield and will be insulated but protected by the chamber 13 of the said device and at the same time be subjected to the temperature of the interior of the automobile whereby clouding, fogging, or frosting of the windshield will be reduced to a minimum or practically eliminated.

When the clear vision device is in position for use as illustrated in Figure 3 of the drawing it is in the line of vision of the operator. In order to enable the bottom wall member 12 to be arranged in an inclined position for collapsing the chamber of the rear vision device as illustrated in Figure 2 of the drawing and also to be arranged in a substantially horizontal position in parallelism with the top wall member 11 of the clear vision device the bottom wall member is preferably composed of two slidably connected sections 30 and 31 which may telescope as shown in the drawing but which may be of any other suitable construction for providing an adjustable bottom wall adapted to be lengthened or shortened accordingly as the clear vision device is arranged in an operative position or in an inoperative position. In separating the sections 3 and 4 of the windshield to provide the sight or lookout opening the upper section is raised and the lower section is lowered and the bottom wall member 12 of the clear vision device is lengthened to enable it to extend from the rear transparent wall or window to the upper edge of the lower section 4 in the lowered position thereof.

In order further to protect the sight or lookout opening of the windshield and the chamber of the clear vision device an air passage 32 is provided for causing a current of heated air to travel upwardly at an inclination across the sight opening and the front end of said chamber 17. The air passage 32 is located directly beneath the hood 33 of the automobile and a lower wall 34 arranged at a slight angle to the hood and forming a rearwardly tapered air passage 32. The air passage 32 is open at its front end at the front of the automobile and is provided at its rear end with an inclined outlet 35 which is located in the bottom of the sight or lookout opening 9 when the clear vision device is in use as illustrated in Figure 3 of the drawing. An air current which is heated to a greater or less extent by the engine of the automobile will travel upwardly and pass across the sight or lookout opening and the front end of the chamber 17 and tend to prevent rain, sleet, snow and wind from entering the chamber 17 and reaching the rear transparent wall or window 15. This action of the current of air through the air passage 32 is also supplemented by a current of air produced by the forward movement of the machine exteriorly of the hood and passing upward in front of the windshield as indicated by the arrows in Figure 3 of the drawing.

What is claimed is:

1. A device of the class described including a windshield designed to be mounted on a vehicle and having relatively movable upper and lower sections and a clear vision device extending rearwardly from said sight opening and having a collapsible chamber movable to an inoperative position when the windshield is closed and to the sight opening of the windshield when the latter is open and having a transparent rear wall offset from the windshield and protected by said chamber.

2. A device of the class described including a windshield designed to be mounted on a vehicle and having relatively slidable upper and lower sections movable toward and from each other to provide a sight opening and to close the same, and a collapsible chamber extending rearwardly from the windshield and movable to an inoperative position when the windshield is closed and to the sight opening when the windshield is open and having a transparent rear wall forming a clear vision window rearwardly offset from the windshield and protected by said chamber.

3. A device of the class described including a windshield designed to be mounted on a vehicle and provided with a sight opening, and a clear vision device extending rearwardly from the sight opening and having an insulating chamber and provided at the rear end thereof with a transparent rear wall offset from the windshield and reversibly mounted to arrange it in position for wiping and cleaning.

4. A device of the class described including a windshield designed to be mounted on a vehicle and provided with a sight opening, and a clear vision device extending rearwardly from the sight opening and having an insulating chamber and provided at the rear end thereof with a transparent rear wall offset from the windshield and pivotally mounted and reversible for wiping and cleaning.

5. A device of the class described including a windshield designed to be mounted on a vehicle and provided with a sight opening, and a clear vision device extending rearwardly from the sight opening and having an insulating chamber and provided at the rear end thereof with a transparent rear wall offset from the windshield and pivotally mounted for movement on a horizontal axis to enable it to be reversed for wiping and cleaning and also for arranging it edgewise to afford an unobstructed view through the chamber and the sight opening of the windshield.

6. A device of the class described including a windshield adapted to be mounted on a vehicle and having upper and lower relatively slidable sections adapted to be separated to provide a sight opening and movable to close the same, and a clear vision device comprising a top wall connected with the upper windshield section, a rear transparent wall forming a clear vision window, and a bottom wall movably connected with the lower section of the windshield and the bottom of the rear wall, said top and bottom walls defining a collapsible chamber and adapted to insulate the transparent rear wall when the clear vision device is in use.

7. A device of the class described including a windshield designed to be mounted on a vehicle and having slidable upper and lower sections adapted to be separated to provide a sight opening and a clear vision device extending rearwardly from the windshield and provided with a transparent rear wall, and top and bottom walls connected with the sections of the windshield and having relative movement for collapsing the clear vision device, one of said upper and lower walls being adjustable and extensible to enable said walls to be arranged at an angle to each other when the clear vision device is collapsed and to be arranged in substantial parallelism when the said device is in operative position.

8. A device of the class described including a windshield designed to be mounted on a vehicle and provided with a sight opening, a clear vision device extending rearwardly from the sight opening and provided with a transparent rear wall and forming an insulating chamber in advance of the rear wall, and an air passage located within the hood of the vehicle to which the device is applied and extending rearwardly from the front end of the hood and having an outlet located at the lower portion of the windshield and arranged to direct a current of warm air across the sight opening when the windshield is open.

9. A device of the class described including a windshield designed to be mounted on a vehicle and provided with a sight opening, a clear vision device extending rearwardly from the sight opening and provided with a transparent rear wall and forming an insulating chamber in advance of the rear wall, and an air passage located under the hood of the vehicle to which the device is applied and extending rearwardly from the front end of the hood and tapered rearwardly and provided at the rear end with an inclined outlet arranged to cause a current of air to traverse the sight opening of the windshield.

10. A device of the class described including a windshield designed to be mounted on a vehicle and provided with a sight opening, a clear vision device extending rearwardly from the sight opening and provided with a transparent rear wall and forming an insulating chamber in advance of the rear wall, an air passage extending longitudinally of the hood of the vehicle to which the device is applied and open at its front end to the atmosphere and provided at its rear end with an outlet located at the lower portion of the windshield and arranged to direct a current of air across the sight opening when the windshield is open.

11. A device of the class described including a windshield designed to be mounted on a vehicle and provided with a sight opening, a clear vision device extending rearwardly from the sight opening and having an insulated chamber and provided at the rear end thereof with a transparent rear wall offset from the windshield, and means pivotally mounting said transparent rear wall for turning movement about an axis whereby said wall may be reversed for cleaning purposes.

GEORGE McMULLEN.